United States Patent
Sim et al.

(10) Patent No.: US 8,945,668 B2
(45) Date of Patent: Feb. 3, 2015

(54) PHENOXY RESIN COMPOSITION FOR TRANSPARENT PLASTIC SUBSTRATE AND TRANSPARENT PLASTIC SUBSTRATE USING THE SAME

(71) Applicant: Toray Advanced Materials Korea Inc., Gyeongsangbuk-do (KR)

(72) Inventors: Chang-Hoon Sim, Seoul (KR); Yeun-Soo Kim, Gyeongsangbuk-do (KR); Ki-Jeong Moon, Seoul (KR)

(73) Assignee: Toray Advanced Materials Korea Inc., Gyeongsangbuk-Do (KR)

( * ) Notice: Subject to any disclaimer, the term of this patent is extended or adjusted under 35 U.S.C. 154(b) by 0 days.

(21) Appl. No.: 14/106,572

(22) Filed: Dec. 13, 2013

(65) Prior Publication Data
US 2014/0107248 A1    Apr. 17, 2014

Related U.S. Application Data

(63) Continuation of application No. 13/311,369, filed on Dec. 5, 2011, now abandoned.

(30) Foreign Application Priority Data

Apr. 25, 2011   (KR) .................. 10-2011-0038357

(51) Int. Cl.
| | | |
|---|---|---|
| *B05D 5/06* | (2006.01) | |
| *C08G 65/48* | (2006.01) | |
| *C08L 71/00* | (2006.01) | |
| *C08G 18/48* | (2006.01) | |
| *C08L 75/08* | (2006.01) | |

(52) U.S. Cl.
CPC .............. *C08G 65/48* (2013.01); *C08L 71/00* (2013.01); *C08G 2650/56* (2013.01); *C08G 18/4879* (2013.01); *C08L 75/08* (2013.01)
USPC ............................ 427/162; 427/164; 427/165

(58) Field of Classification Search
USPC .......................................... 427/162, 164, 165
See application file for complete search history.

(56) References Cited

U.S. PATENT DOCUMENTS

| | | | | |
|---|---|---|---|---|
| 4,387,129 | A | 6/1983 | Vincent ........................ | 428/195 |
| 4,895,767 | A | 1/1990 | Mori et al. .................... | 428/447 |
| 5,427,712 | A | 6/1995 | Nakamura et al. ......... | 252/299.01 |
| 6,046,257 | A | 4/2000 | Oosedo et al. ............... | 523/428 |
| 6,235,842 | B1 | 5/2001 | Kuwano et al. .............. | 525/119 |
| 2007/0181902 | A1 | 8/2007 | Uchida et al. ................ | 257/100 |
| 2008/0226884 | A1* | 9/2008 | Sim et al. ...................... | 428/216 |
| 2008/0292786 | A1* | 11/2008 | Hatano et al. ................. | 427/162 |
| 2009/0062421 | A1 | 3/2009 | Makino et al. ................ | 522/134 |
| 2009/0266583 | A1* | 10/2009 | Nagasaki et al. ............ | 174/250 |

FOREIGN PATENT DOCUMENTS

| | | | | |
|---|---|---|---|---|
| EP | 0285970 | 10/1988 | ............ | C08G 65/48 |
| EP | 0726579 | 8/1996 | ............ | H01B 1/08 |
| EP | 1970422 | 9/2008 | ............ | C09J 7/00 |
| JP | 54-024993 | 2/1979 | ............ | C08F 220/14 |
| JP | 60-196956 | 10/1985 | ............ | H01L 21/78 |
| JP | 60-223139 | 11/1985 | ............ | H01L 21/78 |
| JP | 11-302528 | 11/1999 | ............ | C08L 71/10 |
| JP | 2001-059015 | 3/2001 | ............ | C08G 59/48 |
| JP | 2003-286390 | 10/2003 | ............ | C08L 63/00 |
| JP | 2005-140376 | 2/2005 | ............ | F22D 1/50 |
| JP | 2006-094523 | 4/2006 | ............ | H04M 1/725 |
| JP | 2006-179318 | 7/2006 | ............ | H05B 33/04 |
| JP | 2006-337408 | 12/2006 | ............ | G10K 15/04 |
| JP | 2007-019001 | 1/2007 | ............ | H01B 13/00 |
| JP | 2010-116515 | 5/2010 | ............ | C08G 59/20 |
| KR | 10-2010-0083697 | 7/2010 | ............ | C08L 83/04 |
| KR | 10-0996349 | 11/2010 | ............ | C09J 163/00 |
| KR | 10-1017191 | 12/2010 | ............ | H01L 31/042 |
| WO | WO 9815597 | 4/1998 | ............ | C08L 71/10 |

OTHER PUBLICATIONS

Kukdo (2004) YP-50 "Phenoxy Resin." Retrieved from the internet URL: http://www.kukdo.com/file/goods/YP-50_TDS_1.pdf.
European Search Report in European Patent Application No. EP 11191912.2-2102, dated May 4, 2012.

* cited by examiner

*Primary Examiner* — Elizabeth Burkhart
(74) *Attorney, Agent, or Firm* — Harness, Dickey & Pierce, P.L.C.

(57) ABSTRACT

Provided are a phenoxy resin composition for transparent plastic substrate and a transparent plastic substrate using the phenoxy resin composition, capable of effectively substituting for a conventional glass substrate since having excellent thermal and chemical resistance, high adhesiveness, low water infiltration, and a small coefficient of linear thermal expansion. In one general aspect, there is provided a phenoxy resin composition for transparent plastic substrate, including: phenoxy resin having a chemical structure expressed as follows:

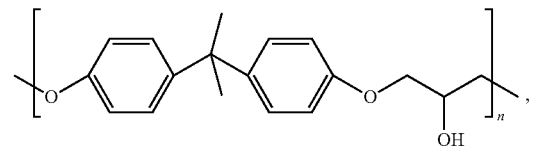

wherein the n value is 35 to 400.

6 Claims, No Drawings

PHENOXY RESIN COMPOSITION FOR TRANSPARENT PLASTIC SUBSTRATE AND TRANSPARENT PLASTIC SUBSTRATE USING THE SAME

CROSS-REFERENCE TO RELATED APPLICATION

This application is a continuation application of U.S. Ser. No. 13/311,369, filed Dec. 5, 2011, which claims the benefit of Korean Patent Application No. 10-2011-0038357, filed on Apr. 25, 2011. The entire disclosures of the applications identified in this paragraph are incorporated herein by reference for all purposes.

FIELD

The following disclosure relates to a phenoxy resin composition for transparent plastic substrate and a transparent plastic substrate using the same. More particularly, this disclosure relates to a phenoxy resin composition for transparent plastic substrate having excellent thermal and chemical resistance, high adhesiveness, low water infiltration, and a small coefficient of linear thermal expansion, and a transparent plastic substrate using the phenoxy resin composition capable of effectively substituting for a conventional glass substrate.

BACKGROUND

This section provides background information related to the present disclosure which is not necessarily prior art.

Information display technologies are being developed from achieving high performance and functionality for showing objects with reality toward providing mobility and maximizing convenience, along with development of mobile terminals, such as mobile phones, PDA, etc. In order to meet recent requirements for information display, demands for flexible displays (FDs) that are free from spatial and structural limits while having a light weight and being easily folded are greatly increasing.

A flexible display is a display fabricated with a thin, flexible substrate that can be curved or bent. The flexible display can be classified into a rugged display, a bendable display, and a rollable display. The flexible display is continuously being studied and developed with the aim of commercializing a paper-like display, in order to implement a variety of applications without spatial and structural limits by substituting heavy, fragile sheet glass having been used in conventional Flat Panel Display (FPD), such as a TFT substrate for LCD or organic EL display, a color filter substrate, a substrate for touch screen panel, a substrate for solar cell, etc., for a thin, flexible substrate.

Main technologies for implementing such a flexible display include technologies of discovering materials for flexible substrate, of discovering organic and inorganic materials suitable for a low-temperature process, and of sealing flexible electronics. The technology of developing materials for flexible substrate among the above-mentioned technologies is considered as an essential technology since a substrate material has a great influence on deciding the performance, reliability, and price of a display.

Essential properties that are required to materials for flexible substrate are thinness, light-weight, low cost, and process fit. As substrate materials that satisfy the properties, metal foil, very thin glass, polymer plastic, etc. have been put into consideration. For industrial commercialization, it is essential to ensure yield through roll-to-roll process, and in yield terms, a polymer plastic substrate is receiving an increasing amount of attention.

Metal foil needs introduction of separate insulated coating layers although it has thermal resistance and flexibility, and also is naturally limited in technical fields requiring transparency. Very thin glass has advantages of good surface flatness and low water and oxygen permeability, while having disadvantages of weakness against impact and insuitability for roll-to-roll process compared to other materials for substrate. Meanwhile, polymer plastic is attracted as the most prospective substrate material since it does not have the above-mentioned disadvantages, is light-weighted, and also easy to be processed without structural limits.

Polymer for fabricating such polymer plastic substrates includes polyethylene terephthalate (PET), polyethersulfone (PES), polyethylene naphthalate (PEN), polyacrylate (PAR), polycarbonate (PC), polyimide (PI), etc. However, conventional plastic substrates have a critical disadvantage of having a great coefficient of thermal expansion (CTE). In other words, generally, polymer physically changes by segmental motion of local molecular chains near a glass transition temperature Tg of polymer, so that the polymer becomes subject to a sharp change in dimension in a high temperature process above the glass transition temperature Tg. Generally, glass has a CTE of several ppm/, while polymer has a relatively great CTE reaching several tens of ppm/° C. The great CTE of polymer may cause problems of deteriorating dimensional stability upon fabricating devices such as TFT on a plastic substrate and generating crack and peel-off of inorganic layers. Recently, studies into composite resins using thermosetting epoxy resin or transparent acrylic resin to which glass filter is added in order to overcome the disadvantages of the plastic substrate material are underway. Such composite resins are disclosed in Japanese Laid-open Patent Applications No. 06-337408, No. 2001-59015, No. 54-24993, No. 06-094523 and No. 05-140376. In the case where thermosetting epoxy resin is used in substrates formed with conventional composite resins, impact resistance becomes low due to strong brittleness of epoxy resin, which makes it difficult to fabricate a flexible film. In the case of using transparent polymer resin with glass filler, birefringent may occur due to a difference in index of refraction. Also, there is still a disadvantage of a great CTE and insufficient thermal resistance so that high dimensional stability can no longer be maintained.

Recently, a resin composition which can overcome a problem of index of refraction when glass filler is added to the resin composition using unhydrolyzation reaction of siloxane, apart from the above-mentioned material for plastic substrate and its composition, has been introduced. For example, Korea Laid-open Patent Application No. 10-2010-0083697 discloses a composition having high transparency and a small CTE by using transparent siloxane resin created by unhydrolyzation reaction of glass filler. However, since the composition also still has a weak mechanical strength and low durability and particularly has low adhesiveness with respect to inorganic layers, there is the possibility that the composition will be cracked and peeled off during a fabrication process. Also, due to a batch process in which glass filler is impregnated and additional yield reaction has to be performed, there is limitation in fabricating films by a roll-to-roll process for low cost other than sheets, and particularly, there are difficulties in discovering a substrate substance requiring a thin thickness below 20 μm.

As a result of studies into various polymer materials that can be used as a plastic substrate material, available polymer and its composition, other than the polymer for plastic substrate as mentioned above, have been discovered.

Essential physical properties required to polymer as a material for plastic substrate are as follows.
1) Dimensional stability
2) Small CTE
3) High barrier property
4) Rigidity
5) High visible light transmittance
6) Durability Other than the physical properties mentioned above, thinness, light-weight, and ensuring a roll-to-roll process are needed, and also compatibility capable of being applied to various types of display substrates is required.

First, dimensional stability is required to minimize deformation caused by expansion and contraction when a polymer substrate is exposed to a maximum process temperature and time. Thermal resistance becomes a barometer of dimensional stability. Generally, thermal resistance at a temperature of 200° C. or higher is required, and in some high temperature processes, thermal resistance at a temperature of 300° C. or higher is required.

In the case of a CTE, generally, a CTE of 20 ppm/° C. or lower is preferable; however, there is no polymer substrate that satisfies the CTE of 20 ppm/° C. An inorganic material (particularly, a driving part) is deposited on a plastic substrate, and if a difference in CTE between the inorganic material and the plastic substrate is great, the inorganic layer may be cracked or peeled off. Accordingly, a material having a small CTE is preferably used to fabricate a flexible display.

Then, in the case of barrier property, requirements for use as a substrate material that can substitute for glass are very critical. Oxygen, water, particles, etc. incoming from the outside may contaminate liquid crystal or driving devices or may oxidize electrode metal layers in the case of OLED, which may influence lifetime reduction of the display.

Generally, moisture vapor permeability of polymer has a great value of 1 to 100 g/m²[day], LCD requires moisture vapor permeability below $10^{-2}$ g/m²[day], and OLED requires moisture vapor permeability below $10^{-6}$ g/m²[day].

Then, rigidity has important meaning in determining process fit of substrates, and is defined by a function of young's modulus (E), thickness (t), and poisson's ratio (v). Rigidity can be expressed by Equation (1):

$$\text{Rigidity} = E \times t^3/12(1-v) \quad (1)$$

A plastic substrate requires appropriate rigidity, and it is seen from equation 1 that rigidity is better as a substrate deformation rate is low and its elastic modulus is great regardless of changes in thickness.

Then, in the case of visible light transmittance, high visible light transmittance has to be maintained without scattering or changes in reflectance due to a degree of crystallization or a change in surface of a polymer material, which are important material properties having great influence on image characteristics and consumption power of a display. Most of the existing optical substrates show high transmittance exceeding 85% at the wavelength of 550 nm and have small differences in transmittance from films applied thereon.

Finally, durability has a great influence on a lifetime of a flexible plastic substrate. That is, since a plastic substrate has a multi-layer structure where organic and inorganic materials, such as a base substrate, a barrier, transparent electrodes, etc., are applied, internal stress is caused when the plastic substrate is bent or curved, and adhesive failure occurs on a thin film applied on the plastic substrate, accompanied by cohesive failure made in a thin film applied on the plastic substrate.

Accordingly, in order to implement a paper-like display using a flexible substrate, durability has to be necessarily guaranteed.

In order to acquire the required physical properties, studies into materials for plastic substrates have been actively conducted, however, appropriate polymer that satisfies all the required physical properties has not yet been found out.

Among the above-mentioned polymer materials, the PC has excellent mechanical, optical properties but has low chemical resistance, so that it has limitation of available solvents (PR developer, PR remover, metal etchant cleaning solvent). In order to overcome the problem to ensure chemical resistance on both sides of a PC substrate, it is necessary to form a separate chemical resistance layer. Also, the PC substrate has resistance against ultraviolet light, which makes limitation upon substrate processing. Besides, the PC substrate contains much out-gas and its CTE is 10 times greater than inorganic materials. Furthermore, the PC substrate has to be processed at a lower temperature (a maximum temperature range of about 150 to about 180° C.) than existing glass substrates.

The PET has been examined as a material for substrate for a long time since the PET has low water absorption and a low melting temperature so that it can be used to fabricate polymer substrates at a relatively low temperature with low cost. However, the PET shows poor thermal stability and optical anisotropy due to a low Tg, and accordingly it cannot be applied to substrates for display that use a polarizer such as LCD. Particularly, PET molecule chains are recrystallized upon heat treatment above 150° C. to cause a whitening phenomenon in which the substrate becomes locally white, thereby degrading optical transmittance of the substrate.

Next, the PEN, which is plastic having optical anisotropy that acts similar to the PET described above, has the problem similar as in the PET in view of thermal stability. However, recently, studies into a possibility that the PEN can be used as a material for substrate are being conducted.

The PES, which was initially commercialized by Sumitomo Bakelite Co., Ltd. in Japan, has good thermal resistance, and accordingly, studies into using the PEC as a material for substrate are actively being conducted. However, the PES has poor chemical resistance, a great CTE, and a low maximum process temperature (e.g., about 180° C.), and requires an additional dehydration process when the PES as polymer having high hygroscopic property contacts water or is exposed to air for a long time. Furthermore, the PES is expensive compared to glass.

Next, the PI, which is a polymer film that is widely applied to electrical and electronic components due to its excellent chemical and thermal resistance, has more excellent hygroscopic property (about 3 times) than the PES and requires an appropriate dehydration process necessarily. An imide group of each molecular chain of PI offers thermal resistance and simultaneously becomes a factor of generating yellowing. Particularly, light transmission of the PI is about 30% to about 50% with respect of visible light having a wavelength of 550 nm, and such low optical property becomes a roadblock to application as a substrate material for display. Recently, Mitsubishi Gas Co., Ltd. was developed a PI substrate (a product name Neopulim™) that is optically transparent (visible light transmittance of 80% or higher) and has a high Tg (>300° C.) using changes in PI molecule chains.

Meanwhile, an AryLite substrate is an optical substrate that was developed by Ferrania Image System in Italia, and shows excellent thermal, optical and chemical characteristics compared to other plastic substrate materials. However, the AryLite substrate also has a great CTE and UV resistance, which make limitation upon substrate processing. Furthermore, AryLite is expensive compared to glass.

For these reasons, as a plastic substrate material for flexible display capable of substituting for a glass substrate, a new polymer composition for plastic substrate having more excellent physical properties than conventional plastic substrate materials is needed.

SUMMARY

This section provides a general summary of the disclosure, and is not a comprehensive disclosure of its full scope or all of its features.

The following description relates to a phenoxy resin composition for transparent plastic substrate, having excellent thermal and chemical resistance, high adhesiveness, low water infiltration, and a small coefficient of linear thermal expansion, and a transparent plastic substrate using the phenoxy resin composition, capable of effectively substituting for a conventional glass substrate.

In one general aspect, there is provided a phenoxy resin composition for transparent plastic substrate including phenoxy resin having Chemical Formula (1) as follows:

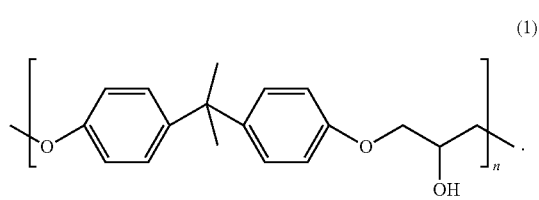

(1)

In the chemical structure of the phenoxy resin, the n value is from 35 to 400, inclusive.

The phenoxy resin composition further includes at least one selected from Bisphenol-A phenoxy, Bisphenol-A/Bisphenol-F phenoxy, Brominated phenoxy, phosphorous phenoxy, Bisphenol-A/Bisphenol-S phenoxy, Caprolactone modified phenoxy, and Siloxane modified phenoxy.

A weight-average molecular weight of the phenoxy resin is from about 1,000 to about 100,000.

An end of the phenoxy resin (e.g. a terminal group) includes at least one of an epoxy group, a hydroxyl group, an amine group, a fluorine group, a siloxane group, and an amide group.

The phenoxy resin composition further includes energy-ray curable acrylic oligomer or acrylic polymer resin.

The phenoxy resin composition further includes at least one photoinitiator selected from benzophenon, acetophenon, dibenzyle, diacetyl, diphenyl sulfide, and azobisisobutyronitrile.

The phenoxy resin further includes at least one crosslinking agent the phenoxy resin selected from melamine, urea-formaldehyde, isocyanate functional prepolymer, a phenolic curing agent, and an amino-group curing agent.

In one general aspect, there is provided a material for transparent plastic substrate using the phenoxy resin composition for transparent plastic substrate, wherein the material for transparent plastic substrate is formed by processing the phenoxy resin composition in the form of a film or sheet having a thickness of about 25 to about 1,000 microns through a solvent casting method or a melt extrusion method.

The material for transparent plastic substrate is used to fabricate a flexible plastic substrate capable of substituting for a glass substrate used in an optical device substrate and a Flat Panel Display (FPD) substrate, such as a Thin Film Transistor (TFT) substrate for LCD or organic EL display, a color filter substrate, a substrate for touch screen panel, and a substrate for solar cell.

The phenoxy resin composition is applied as a thin or thick film having a thickness of from about 0.1 to about 500 microns on a polymer material.

The material for transparent plastic substrate is used to fabricate a flexible plastic substrate capable of substituting for a glass substrate used in an optical device substrate and a Flat Panel Display (FPD) substrate, such as a Thin Film Transistor (TFT) substrate for LCD or organic EL display, a color filter substrate, a substrate for touch screen panel, and a substrate for solar cell.

Accordingly, the resin composition can be effectively used as a material for transparent plastic substrate capable of substituting for conventional glass substrates, since the resin composition has excellent thermal and chemical resistance, high adhesiveness, low water infiltration, and a small coefficient of linear thermal expansion. Also, the resin composition can be used to fabricate a flexible plastic substrate that can substitute for a glass substrate used in a Flat Panel Display (FPD), such as a Thin Film Transistor (TFT) substrate for LCD or organic EL display, a color filter substrate, a substrate for touch screen panel, and a substrate for solar cell.

Other features and aspects will be apparent from the following detailed description, the drawings, and the claims. The description and specific examples in this summary are intended for purposes of illustration only and are not intended to limit the scope of the present disclosure.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

In examples suggested in this specification, it is characterized that phenoxy resin is used as a material for fabricating a transparent plastic substrate for flexible display. The phenoxy resin can be effectively used as a material for fabricating a transparent plastic substrate capable of substituting for a conventional glass substrate since the phenoxy resin has excellent thermal and chemical resistance, high adhesiveness, low water infiltration, and a small coefficient of linear thermal expansion.

Also, since the phenoxy resin is basically thermoplastic polymer and has a low melting point, the phenoxy resin can be subject to a method of fabricating substrates through direct extrusion without using a solvent, as well as to a solvent casting method using a solvent. Therefore, the phenoxy resin can be used to fabricate various kinds of polymer substrates having different thicknesses in the form of a sheet or film.

Also, since the phenoxy resin has a structure allowing cross-linking of molecules due to a hydroxyl group in molecular chains, additional curing after forming of a sheet or film is allowed to fabricate polymer substrates having excellent thermal properties.

In addition, since the phenoxy resin has excellent transparency, it can be used as a polymer substrate material for fabricating flexible substrates requiring transparency, and particularly, since the phenoxy resin has no resistance against ultraviolet light, it can be used to fabricate flexible polymer substrates having no limits in fabricating devices on flexible substrates in the PCB process.

Also, the phenoxy resin may be made with a combination of various compositions in order to more appropriately meet requirements for plastic substrates. The phenoxy resin may be formed with a single kind of phenoxy resin composition or by depositing a phenoxy resin composition on another polymer material.

The phenoxy resin according to the current example is characterized that its molecular chains are linear and have a great molecular weight, unlike general solid epoxy resin. The phenoxy resin is acquired through additional reaction from solid epoxy resin such as Bisphenol-A. Generally, solid epoxy resin has at least one molecular chain that is repeated n times maximally, and at this time, the epoxy resin is in a solid state at room temperature. Solid epoxy resin that is currently being sold has a number-average molecular weight from about 900 (n=1.97) to 10,000 (n=34). Resin having a number-average molecular greater than 10,000 exists in a linear state and is classified to phenoxy resin. Generally, if a certain material has a great molecular weight and its molecular chains exist in a linear state, the material has a thermoplastic property. That is, the phenoxy resin also basically has the thermoplastic property. Also, since each molecular chain of the phenoxy resin contains a functional group allowing crosslinking, the phenoxy resin has a thermosetting property through thermosetting when a reaction catalyzer is added thereto.

Accordingly, the phenoxy resin has been adapted as a plastic substrate material in consideration that it has two properties described above at the same time, that is, thermoplastic and thermosetting properties.

In the current example, the phenoxy resin has a chemical structure expressed by Chemical Formulation (1):

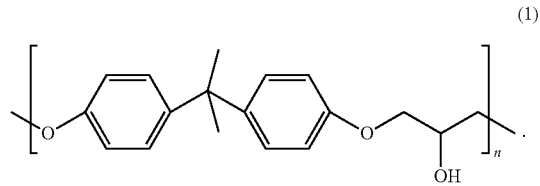

(1)

The n value of Chemical Formula (1) is from 35 to 400, inclusive.

The phenoxy resin according to the current example has the properties of thermoplastic resin having a great molecular weight, whose unit structure is the final thermosetting structure of thermosetting epoxy resin. Accordingly, the phenoxy resin can be processed by melt extrusion of melting and extruding resin in a solid state or by solvent casting such as coating using solvent.

The phenoxy resin includes Bisphenol-A phenoxy, Bisphenol-A/Bisphenol-F phenoxy, Brominated phenoxy, phosphorous phenoxy, Bisphenol-A/Bisphenol-S phenoxy, Caprolactone modified phenoxy, Siloxane modified phenoxy, etc. The Bisphenol-A phenoxy among the above-mentioned materials is preferable since it is excellent in view of thermal resistance, environmental-friendly, miscibility, and hardening rate. Also, the weight-average molecular weight of the phenoxy resin is preferably from about 1,000 to about 500,000, more preferably, from about 1,000 to about 100,000, and most preferably from about 30,000 to about 70,000. If the weight-average molecular weight is less than 1,000, hardening is initially performed, like epoxy resin, which increases brittleness, and in this case, the phenoxy resin itself is not easy to be fabricated in the form of a film. If the weight-average molecular weight is greater than 100,000, the phenoxy resin has the properties of thermoplastic resin but simultaneously has high cohesion, so that it may result in low coating quality when a phenoxy resin film is formed by coating or the like, and also, a miscibility problem may occur when the phenoxy resin is contained in a composition.

Organic solvent capable of dissolving the phenoxy resin includes a ketone group, an alcohol group, a glycol ether group, and an ester group. Examples of the organic solvent include Cyclohexanone, Methylethylketone, Benzyl alcohol, Diethylene glycol alkyl ether, phenoxy propanol, propylene glycol methyl ether acetate, Tetrahydrofuran, N-methylpyrrolidone or a combination thereof. In the case of using organic solvent, 5 to 40 weight part of phenoxy resin per 100 weight part of organic solvent is preferable, and 20 to 35 weight part of phenoxy resin is more preferable.

In addition, the phenoxy resin may be used with an appropriate crosslink agent, and the crosslink agent may be an arbitrary agent that has the hydroxyl group as a function group and can harden resin. The crosslink agent for phenoxy resin may be at least one of melamine, urea-formaldehyde, isocyanate functional prepolymer, phenolic curing agent, and amino-group curing agent. 0.1 to 40 weight part of thermosetting agent per 100 weight part of phenoxy resin is preferably used, and more preferably, 5 to 20 weight part of thermosetting agent is used.

The phenoxy resin according to the current example has the properties of thermoplastic resin, that is, a great molecular weight and a final thermosetting structure of thermosetting epoxy resin as a unit structure. Accordingly, the phenoxy resin can be easily processed by melt extrusion of melting and extruding resin in a solid state or by solvent casting, such as coating using solvent. The melt extrusion may be one of existing film extrusion methods, and the phenoxy resin may be formed as a film with solid phenoxy resin by applying a phenoxy resin solution on a release material and then drying it according to a well-known method, such as knife coater, gravure coater, etc.

The structure of the phenoxy resin includes a bis-phenol structure containing a benzene ring in a molecular center, resulting in high thermal resistance, high durability, and high tensile strength.

In the current example, since the phenoxy resin has the hydroxyl group, it provides excellent adhesion and requires no separate curing process. Also, if molecule units are repeated to have a polyol property, excellent gas barrier properties are achieved so that the phenoxy resin can be optimally used as a flexible substrate material.

Since the phenoxy resin includes the ether group, it has high chemical resistance, low melt viscosity, and flexibility of chains, resulting in good processing properties.

A function group may be added to an end of the phenoxy resin, as necessary. For example, the function group includes an epoxy group, a hydroxyl group, an amine group, a fluorine group, etc., which can be used to control the refraction index or adhesiveness of the phenoxy resin. Also, the hydroxyl group in the phenoxy resin may be substituted by a molecule chain having different properties, as necessary. For example, the hydroxyl group may be substituted by a siloxane group, an amide group, a hydrogen bond, or molecular chains allowing dehydrogenation. That is, the phenoxy resin may be modified to obtain excellent thermal resistance, an appropriate index of refraction, high adhesiveness, a sufficient tensile strength, low water infiltration, etc.

Also, in the current example, acrylate low molecular compound having an unsaturated group that allows energy-ray curing, or acryl polymer resin may be used in order to enhance chemical resistance against solvent containing a ketone group. The acrylate compound or the acryl polymer resin needs to be thermodynamically easily mixed with phenoxy resin so as not to degrade transmittance. Accordingly, a difference in index of refraction between the acrylate compound (or the acryl polymer resin) and phenoxy resin has to be small. 5 to 95 weight part of the acrylate compound (or the acrylate polymer resin) per 100 weight part of phenoxy resin may be used, preferably, 10 to 70 weight part of the acrylate compound (or the acrylate polymer resin) may be used, and more preferably, 30 to 50 weight part of the acrylate compound (or the acrylate polymer resin) may be used. The energy-ray curable acryl resin includes acryl polymer having double bonds, acryl oligomer, acryl monomer, etc., and may include an arbitrary material that can be cured by energy-ray. The energy-ray curable acryl resin has at least one double bond in its molecule. An example of such energy-ray curable acryl resin is disclosed in Japanese Laid-open Patent Applications No. 60 (1985)-0196956 and No. 60 (1985)-0223139. For example, the energy-ray curable acryl resin may be an acrylate compound, such as trimethylolpropane triacrylate, tetramethylol methane tetraacrylate, pentaerythritol triacrylate, epoxy acrylate, or the like.

Also, the phenoxy resin composition for transparent plastic substrate can use photoinitiator to initiate curing of a UV curable low molecular compound. For example, the photoinitiator may be benzophenon, acetophenon, dibenzyl, diacetyl, diphenyl sulfide, azobisisobutyronitrile, and so on. The photoinitiator may be used by 0.5 to 10 (preferably, 1 to 5) weight part per 100 weight part of the energy-ray curable low molecular compound.

When the phenoxy resin composition for transparent plastic substrate is used to form a film, the thickness of the film may be preferably from 1 to 1,000 microns, more preferably 25 to 100 microns, and most preferably 30 to 70 microns. If the thickness of the film is thinner than 1 micron, the tensile property of the film is degraded, and if the thickness of the film exceeds 1,000 microns, coating quality may be degraded. In the case where the film needs to have a thickness of 500 microns or more, coating through a slot die or fabricating a sheet by extrusion is preferable.

According to the current example, a polymer substrate can be easily fabricated by using phenoxy resin as a main material. Therefore, it is possible to mass-produce polymer substrates using a conventional process, such as coating or extrusion, which has been widely used. Also, it is possible to apply the phenoxy resin directly or to coat the phenoxy resin as a thin or thick film on another transparent polymer material. Here, the other polymer material includes a conventional material for polymer substrate, such as PC, PES, PI, PET, PEN, etc., however, the other polymer material is not limited to the above-mentioned materials. It can be effectively used to coat the phenoxy resin composition as a thin or thick film in order to overcome drawbacks of conventional materials for polymer substrate. For example, the phenoxy resin composition is applied on a PC film having low chemical resistance or on a PES or PI film vulnerable to water infiltration, thereby making it possible to significantly improve the functional, physical properties of substrates. In the case of coating the phenoxy resin on another material, the thickness of the coating layer may be preferably about 0.1 to about 500 microns, more preferably about 0.5 to about 100 microns, and most preferably about 1 to about 50 microns. If the thickness of the coating layer is thinner than 0.1 microns, the adhesiveness of the coating layer to a material is degraded, and if the thickness of the coating layer exceeds 500 microns, coating quality may be degraded.

The phenoxy resin composition may be used in optical devices, displays, and thin Film Transistor (TFT) devices in which glass substrates are used.

In the case where the phenoxy resin composition is used to fabricate displays, such as substrates for LCD, touch screen panel, color filter, organic EL display, and solar cell, or in optical devices, the phenoxy resin composition may be formed preferably in the form of a sheet and the thickness of the sheet may be about 15 to about 500 μm, preferably about 30 to about 80 μm. Also, when devices for the above-mentioned purposes are fabricated, the CTE is preferably 30 ppm/°C. or less, more preferably, 1 to 20 ppm/°C. in the temperature range of about 25 to about 250°C. In regard of transmittance, when the phenoxy resin composition is used to fabricate substrates for display, its transmittance is preferably 80% or higher and most preferably, 90% or higher at the wavelength of 550 nm. If the transmittance of the phenoxy resin is 80% or lower at the wavelength of 550 nm, the display has low visibility, resulting in low display performance.

Hereinafter, the configuration and effect of the present invention will be described in more detail by proposing embodiments and comparative examples. Nevertheless, it will be understood that various modifications may be made.

EXAMPLE

Embodiment 1

Phenoxy resin (Kukdo Chemical., YP50) of 100 g was resolved in methylethyl ketone solution of 300 g, then the resultant solution was mixed with an isocyanate thermosetting agent (Dowcorning, CE138) of 15 g, and the mixture was stirred for one hour. The stirred phenoxy resin composition was applied on a release film (TORAY Advanced Materials Korea Inc., XD5BR) and the resultant phenoxy resin composition was dried for about 3 minutes at 150° C. in a dryer. The thickness was measured to about 30 μm. Then, the release film was removed from the phenoxy resin composition, thereby finally acquiring a film formed only with the phenoxy resin composition.

Embodiment 2

Phenoxy resin (Kukdo Chemical., YP50) of 100 g was resolved in methylethyl ketone solution of 300 g, then the resultant solution was mixed with an isocyanate thermosetting agent (Dowcorning, CE138) of 15 g, polyurethane acrylate (JAPAN SYNTHESIS CHEMICAL, Inc., UV7600B80) of 20 g, which is energy-ray curable oligomer, and acrylic phosphine group photoinitiator (CYTEC, DAROCUR TOP) of 2 g, and the mixture was stirred for one hour. The stirred phenoxy resin composition was applied on a release film (TORAY Advanced Materials Korea Inc., XD5BR) and the resultant phenoxy resin composition was dried for about 3 minutes at 150° C. in a dryer. The thickness was measured to about 30 μm. Then, an ultraviolet light was irradiated on the dried tape, energy-ray curing was performed to form an additional crosslinking structure, and then, the release film was removed, thereby finally acquiring a film formed only with the phenoxy resin composition.

Embodiment 3

Phenoxy resin (Kukdo Chemical., YP50) of 100 g was resolved in methylethyl ketone solution of 300 g, then the resultant solution was mixed with an isocyanate thermosetting agent (Dowcorning, CE138) of 15 g, polyurethane acrylate (JAPAN SYNTHESIS CHEMICAL, Inc., UV7600B80) of 20 g, which is energy-ray curable oligomer, and acrylic phosphine group photoinitiator (CYTEC, DAROCUR TOP) of 2 g, and the mixture was stirred for one hour. The stirred phenoxy resin composition was applied on a polyimide film (SKC Kolon, LN100) having a thickness of 25 μm, and the resultant phenoxy resin composition was dried for about 3 minutes at 150° C. in a dryer. The thickness was measured to about 5 μm. Then, an ultraviolet light was irradiated on the dried tape, and energy-ray curing was performed to form an additional crosslinking structure, thereby finally acquiring a composition film formed with a polyimide-phenoxy resin composition.

Embodiment 4

Phenoxy resin (Kukdo Chemical., YP50) of 100 g was resolved in methylethyl ketone solution of 300 g, then the resultant solution was mixed with isocyanate thermosetting agent (Dowcorning, CE138) of 15 g, polyurethane acrylate (JAPAN SYNTHESIS CHEMICAL, Inc., UV7600B80) of 20 g, which is energy-ray curable oligomer, and acrylic phosphine group photoinitiator (CYTEC, DAROCUR TOP) of 2 g, and the mixture was stirred for one hour. The stirred phenoxy resin composition was applied on a polyethylene-naphthalate (PEN) film (SKC Kolon, NX10) having a thickness of 25 μm, and the resultant phenoxy resin composition was dried for about 3 minutes at 150° C. in a drier. The thickness was measured to about 5 μm. Then, a ultraviolet light was irradiated on the dried tape, and energy-ray curing was performed to form an additional crosslinking structure, thereby finally acquiring a composition film formed with a PEN-phenoxy resin composition.

Comparative Example 1

Comparative Example 1 is a PI film (SKC Kolon, LN100) having a thickness of 25 μm, which is currently on sale.

Comparative Example 2

Comparative Example 2 is a PEN film (SKC Kolon, NX10) having a thickness of 25 μm, which is currently on sale.

The physical properties of films formed with the phenoxy resin composition for transparent plastic substrate according to the embodiments 1 through 4 and the comparative examples 1 and 2 are measured through experimental examples below, and the results of the measurement are shown in Table 2 below.

EXPERIMENTAL EXAMPLES

1. Transmittance

Transmittance was measured at a wavelength of 550 nm using a UV/VIS/NIR spectrum analyzer (UV-3101 PC) of Shimadzu Corporation.

2. Thermal Resistance

While heating a sample up to 600° C. at a heating rate of 5° C./min under a nitrogen environment using a thermogravimetric analyzer (Q-600) of TA Instrument Co., Ltd, a temperature of the sample when 5% reduction from an initial weight occurred was measured.

3. Coefficient of Thermal Expansion

While heating a sample up to 300° C. at a heating rate of 5° C./min under a nitrogen environment using a thermogravimetric analyzer (Q-400) of TA Instrument Co., Ltd, a CTE of the sample was measured in a temperature range of 70 to 200° C. At this time, a load of 100 mN and a frequency of 20 Hz were used.

4. Elastic Modulus at Elevated Temperature

While heating a sample up to 300° C. at a heating rate of 5° C./min under a nitrogen environment using a Dynamic Mechanical Analyzer (DMA-8000) of Perkin Elmer Co., Ltd, an elastic modulus at elevated temperature of the sample was measured at 200° C. At this time, a load of 100 mN and a frequency of 1 Hz were used.

5. Gas Barrier Property

Gas barrier property of a sample was measured after leaving the sample for one day at 23+/− according to ASTM F 1927:2007 using OX-TRANS (Model 2/61) of MOCON.

6. Hygroscopic Property

The hygroscopic property of a sample was measured at 2 atm and 21° C. for 24 hours using Pressure Cooker Test (PCT) equipment.

7. Chemical Resistance

Chemical resistance was measured under conditions shown in Table 1.

TABLE 1

| Chemical Resistance 1 | Acid resistance | 15% HCL aq. 40° C., 5 minutes |
| Chemical Resistance 2 | Alkali resistance | NaOH, 5%, 40° C., 5 minutes |

8. Adhesiveness

In order to determine adhesiveness of a sample with an inorganic thin film in consideration of a substrate process, the sample was cut to have a length of 150 mm and a width of 50 mm and then attached onto copper clad by applying a pressure of 0.2 MPa at a room temperature, and a 180 degrees peel strength of the resultant structure was measured at a rate of 300 mm/min.

TABLE 2

| Classification | Embodiment 1 | Embodiment 2 | Embodiment 3 | Embodiment 4 | Comparative Example 1 | Comparative Example 2 |
|---|---|---|---|---|---|---|
| Total Thickness (μm) | 30 | 30 | 30 | 30 | 25 | 25 |
| Transmittance (%) | 95.3 | 92.8 | 50.2 | 90.6 | 48.7 | 91.0 |
| Tg (° C.) | 114 | 127 | 376 | 124 | 385 | 120 |
| Decomposition temperature (° C.) | 450 | 470 | 517 | 386 | 550 | 380 |

TABLE 2-continued

| Classification | Embodiment 1 | Embodiment 2 | Embodiment 3 | Embodiment 4 | Comparative Example 1 | Comparative Example 2 |
|---|---|---|---|---|---|---|
| Coefficient of thermal expansion (ppm/K) | 26 | 12 | 7 | 17 | 20 | 23 |
| Elastic Modulus (GPa) | 0.23 | 0.28 | 0.28 | 0.34 | 0.28 | 0.61 |
| Gas barrier property cm$^3$/(m$^2$, day) | 0.2 | 0.2 | 6.9 | 1.4 | 150 | 9.7 |
| Hygroscopic property (%) | 0.1 or less | 0.1 or less | 1.3 | 1.2 | 5.6 | 4.2 |
| Chemical resistance 1 | Slight change | No change | Slight change | Slight change | swell | Swell |
| Chemical resistance 2 | Slight change | No change | Slight change | Slight change | swell | swell |
| Adhesiveness gf/inch | Immeasurable (Sample Broken) | 980 | 960 | 1,060 | 0 | 0 |

As shown in Table 2, the phenoxy resin composition according to the current example has high thermal resistance and a small CTE and also has excellent gas barrier property and hygroscopic property compared to the PI and PEN films of Comparative Examples 1 and 2. Particularly, since the phenoxy resin composition shows strong adhesiveness that could never be acquired by conventional materials for plastic substrate, the phenoxy resin composition is expected to ensure excellent durability when it is used as a material for plastic substrate.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for preparing a transparent substrate for flexible display, comprising:
preparing a phenoxy resin composition comprising phenoxy resin of Formula (I):

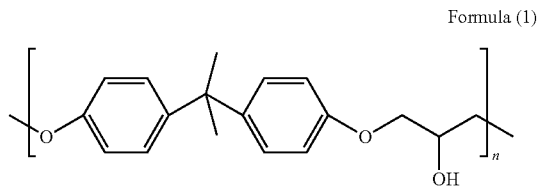

Formula (1)

wherein n value is from 35 to 400, inclusive,
wherein an end of the phenoxy resin comprises one or more groups selected from the group consisting of an epoxy group, a hydroxyl group, an amine group, a fluorine group, a siloxane group, and an amide group,
an energy-ray curable acrylic oligomer or acrylic polymer resin,
a photoinitiator selected from the group consisting of benzophenone, acetophenone, dibenzyl, diacetyl, diphenyl sulfide, azobisisobutyronitrile and a mixture thereof, and
a crosslinking agent selected from the group consisting of melamine, urea-formaldehyde, isocyanate functional prepolymer, a phenolic curing agent, an amino-group curing agent, and a mixture thereof;
forming on a release film the phenoxy resin composition into a film or sheet having a thickness of from about 25 to about 1,000 microns by a solvent casting or melt extrusion method, wherein the film or sheet is used to fabricate a flexible plastic substrate capable of substituting for a glass substrate used in an optical device substrate or a Flat Panel Display (FPD) substrate, a color filter substrate, or a substrate for touch screen panel;
curing the phenoxy resin composition by ultraviolet light; and
removing the release film.

2. The method of claim 1, wherein the film or sheet is applied on a polymer material.

3. The method of claim 1, wherein the phenoxy resin composition further comprises one selected from the grouping consisting of bisphenol-A phenoxy, bisphenol-A/bisphenol-F phenoxy, brominated phenoxy, phosphorous phenoxy, bisphenol-A/bisphenol-S phenoxy, caprolactone modified phenoxy, siloxane modified phenoxy, and a mixture thereof.

4. The method of claim 1, wherein a weight-average molecular weight of the phenoxy resin is from about 1,000 to about 100,000.

5. The method of claim 1, wherein the crosslinking agent is isocyanate functional prepolymer.

6. The method of claim 1, wherein the glass substrate is used in an optical device substrate or the FPD substrate is a Thin Film Transistor (TFT) substrate for LCD or organic EL display.

* * * * *